US007120762B2

(12) United States Patent
Rajwar et al.

(10) Patent No.: US 7,120,762 B2
(45) Date of Patent: Oct. 10, 2006

(54) CONCURRENT EXECUTION OF CRITICAL SECTIONS BY ELIDING OWNERSHIP OF LOCKS

(75) Inventors: Ravi Rajwar, Madison, WI (US); James R. Goodman, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 858 days.

(21) Appl. No.: 10/037,041

(22) Filed: Oct. 19, 2001

(65) Prior Publication Data

US 2003/0079094 A1 Apr. 24, 2003

(51) Int. Cl.
*G06F 12/14* (2006.01)

(52) U.S. Cl. .................. 711/150; 711/151; 711/152

(58) Field of Classification Search ............... 711/150, 711/151, 152
See application file for complete search history.

(56) References Cited

U.S. PATENT DOCUMENTS

| | | | | |
|---|---|---|---|---|
| 5,421,022 A | * | 5/1995 | McKeen et al. | 712/23 |
| 6,684,398 B1 | * | 1/2004 | Chaudhry et al. | 718/106 |
| 2002/0178349 A1 | * | 11/2002 | Shibayama et al. | 712/235 |
| 2003/0014473 A1 | * | 1/2003 | Ohsawa et al. | 709/107 |
| 2003/0014602 A1 | * | 1/2003 | Shibayama et al. | 711/156 |

* cited by examiner

*Primary Examiner*—Pierre Bataille
*Assistant Examiner*—Sheng-Jen Tsai
(74) *Attorney, Agent, or Firm*—Boyle Fredrickson Newholm Stein & Gratz S.C.

(57) ABSTRACT

Critical sections of multi-threaded programs, normally protected by locks providing access by only one thread, are speculatively executed concurrently by multiple threads with elision of the lock acquisition and release. Upon a completion of the speculative execution without actual conflict as may be identified using standard cache protocols, the speculative execution is committed, otherwise the speculative execution is squashed. Speculative execution with elision of the lock acquisition, allows a greater degree of parallel execution in multi-threaded programs with aggressive lock usage.

43 Claims, 3 Drawing Sheets

CONCURRENT EXECUTION OF CRITICAL SECTIONS BY ELIDING OWNERSHIP OF LOCKS

STATEMENT REGARDING FEDERALLY SPONSORED RESEARCH OR DEVELOPMENT

—

CROSS-REFERENCE TO RELATED APPLICATIONS

—

BACKGROUND OF THE INVENTION

The present invention relates to computers with shared-memory architectures and, in particular, to architectures providing a lock mechanism preventing conflicts when multiple program threads execute a common, critical program section.

Multi-threaded software provides multiple execution "threads" which act like independently executing programs. An advantage to such multi-threaded software is that each thread can be assigned to an independent processor, or to a single processor that provides multi-threaded execution so that the threads may be executed in parallel for improved speed of execution. For example, a computer server for the Internet may use a multi-threaded server program where each separate client transaction runs as a separate thread.

Each of the threads may need to modify common data shared among the threads. For example, in the implementation of a transaction based airline reservation system, multiple threads handling reservations for different customers may read and write common data indicating the number of seats available. If the threads are not coordinated in their use of the common data, serious error can occur. For example, a first thread may read a variable indicating an airline seat is available and then set that variable indicating that the seat has been reserved by the thread's client. If a second thread reads the same variable prior to its setting by the first thread, the second thread may, based on that read, erroneously set that variable again with the result that the seat is double booked.

To avoid these problems, it is common to use synchronizing instructions for portions of a thread (often called critical sections) where simultaneous execution by more than one thread would be a problem. A common set of synchronizing instructions implement a lock, using a lock variable having one value indicating that it is owned by a thread and another value indicating that it is available. A thread must acquire the lock before executing the critical section and does so by reading the lock variable and if it is not held, writing a value to it indicating that it is held. When the critical section is complete, the thread again writes to the lock variable a value indicating that the lock is available again.

Typically, the instructions used to acquire the lock are "atomic instructions", that is, instructions that cannot be interrupted once begun by any other thread or quasi-atomic instructions that can be interrupted by another thread, but that make such interruption evident to the interrupted thread so that the instructions can be repeated.

While the mechanism of locking a critical section for use by a single thread effectively solves conflict problems, it can reduce the benefits of parallel execution of threads by effectively serializing the threads as they wait for a lock.

This serialization can be reduced by using a number of different locks associated, for example, with different small portions of shared memory. In this way, the chance of different threads waiting for a lock on a given portion of shared memory is reduced.

Multiple locks increase the complexity of the programming process and thus creates a tradeoff between program performance and program development time.

Ideally, a software tool might be created that could review and correct for overly aggressive use of lock variables by reviewing critical sections in all threads and determining whether a more narrowly defined locking might be employed. The capability of any such a software tool, however, is limited to static analysis of the software and cannot detect locking that is unnecessary during dynamic execution of the software.

SUMMARY OF THE INVENTION

A key insight to the present invention is that it may be possible to execute a critical program section correctly without acquisition of the lock. In many situations a critical section may be executed by multiple threads simultaneously with no actual conflict. This can be for a number of reasons, including the possibility that the different threads are updating different fields of the shared memory block aggregated under a single lock variable, or the store operations in the critical section are conditional and frequently do not require actual conflicting store operations.

In such cases, the steps of acquiring and releasing the lock are unnecessary and can be elided. The critical section can be speculatively executed, assuming there will be no conflict, and in those cases where an actual conflict does occur, the conflict can be detected automatically by existing cache protocol methods and execution of the critical section can be re-performed.

Specifically then, the present invention provides a method of coordinating access to common memory by multiple program threads. Each given program thread first detects the beginning of a critical section of the given program thread in which conflicts to access of the common memory could occur resulting from execution of other program threads. The given thread then speculatively executes the critical section. The speculative execution is committed only if there has been no conflict, and is squashed if there has been a conflict.

Thus, it is one object of the invention to allow parallel execution of critical sections by multiple threads, under the recognition that in many cases, no actual conflict will occur.

The conflict may be another thread writing data that was read by the given program thread in the critical section, or another thread reading or writing data that was written by the given program thread. In one embodiment, this conflict may be determined by invalidation of a cache block holding data of the critical section.

Thus, it is another object of the invention to utilize existing cache protocol mechanisms to provide an indication of whether there has been actual conflict in the execution of the critical section.

Often, the critical section will be speculatively executed to its end. The end of the critical section may be detected by examining patterns of instructions typically associated with lock acquisitions. For example, the pattern may be a store instruction directed to an inferred lock variable. In a similar way, the beginning of a critical section may be deduced by a lock acquisition pattern, including atomic read/modify/write instructions.

Thus, it is another object of the invention to infer the existence of a critical section without modification of existing software or compilers. This inference is possible in part because misprediction of a critical section carries with it very little penalty as will be discussed below.

In certain cases, the speculative execution will conclude at a "resource boundary" placing physical limits on the ability to speculate for long critical sections. For example, resource boundaries may be limits in the cache size used for the speculation or the write buffer size, as will be described below, or other resources needed for speculatively execution. In such cases, where there is no actual conflict but simply a limitation or resources, the lock variable may be acquired by the given thread and the speculative execution committed, and the given thread may then continue execution from the point at which the speculation was committed to the conclusion of the critical section.

Thus, it is another object of the invention to provide for the efficient execution of arbitrarily long critical sections despite limited resources.

The first step of detecting the critical section may include reading of a lock variable and performing the second step of speculative execution only if the lock variable is not held by another program thread.

Thus, it is another object of the invention to avoid performance degradation in certain cases where the critical section experiences a high number of actual conflicts. If the lock has been acquired, the assumption may be made that another processor or thread had to acquire the lock because of its inability to perform a method of the present invention.

The first step of detecting the critical section may include reading a prediction table holding historical data indicating past successes in speculatively executing the critical section, and the speculative execution may be performed only when the prediction table indicates a likelihood of successful speculative execution of the critical section of above a predetermined threshold value.

Thus, it is another object of the invention to avoid speculation for critical sections that are highly contested during actual execution of the program.

The critical section may begin with a lock acquisition section and may end with a lock release section and the present invention may include the step of eliding the lock acquisition and release.

Thus it is another object of the invention to eliminate the steps of acquiring and releasing a lock variable when no actual conflict occurs thus speeding execution of the critical section and allowing other threads to concurrently execute the critical section.

The speculative execution of the critical section may elide write instructions that do not change a value of memory location being written to.

Thus it is another object of the invention to permit concurrent execution even in the presence of a true conflict between threads accessing the same location and at least one performing a "silent write", particularly in the case where cache invalidation procedures are used to detect conflicts.

After squashing the speculative execution of the critical section when there has been a conflict, the critical section may be re-executed a predetermined number of times or until there is no conflict. If there remains a conflict after the repeated re-executions, the lock variable may be acquired.

Thus, it is another object of the invention to allow adjustment of the degree of speculation depending on empirical factors that may be determined.

The speculatively execution of the critical section may use a cache memory to record the speculative execution without visibility to other processing units.

Thus, it is another object of the invention to provide a simple, speculative mechanism utilizing the cache structures available in many computer architectures.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1:
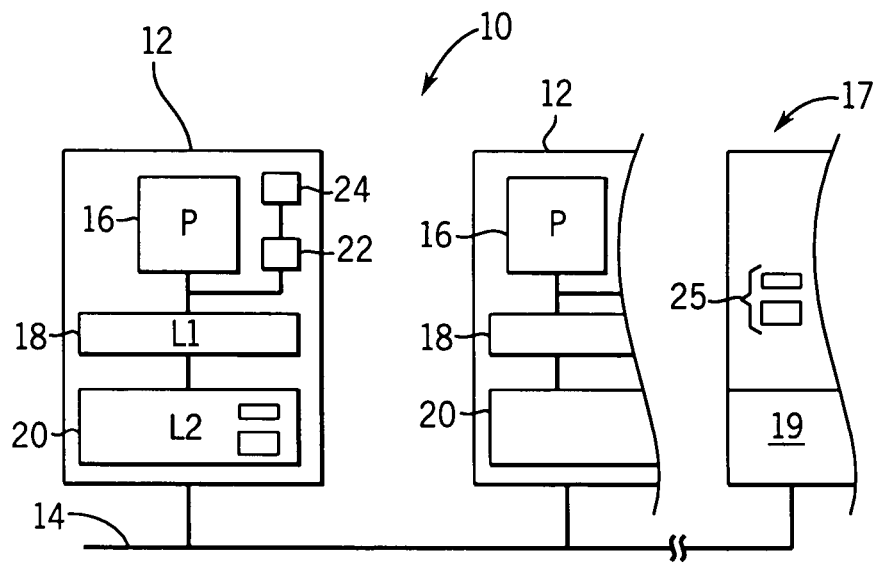
FIG. 1 is a block diagram of the multi-processor system showing processors with their associated caches and cache controllers and the lock elision circuit of the present invention, communicating over a network with a common shared memory.

Referring now to FIG. 1, a multiprocessor, shared memory computer 10 suitable for use with the present invention includes a number of processor units 12 connected via a bus structure 14 to a common, shared memory 17. The shared memory 17 is depicted logically as a single device, but in fact will often be distributed among the processor units 12, according to methods well known in the art.

Processor units 12 include processor 16 communicating with an L1 cache 18, an L2 cache 20, and a cache controller 22 as is well understood in the art. The shared memory 17 includes a memory controller 19 executing standard cache protocols to allow copying of shared data structure 25 within the shared memory to various ones of the L2 caches 20 of particular processor units 12. The processor unit 12 may be granted "owner" status for writing to memory or "sharing" status allowing for reading of the memory. Change of status of the caches 20, for example, when another cache 20 seeks ownership or sharing of the shared data structure 25, may be accomplished by transmission of the request to then currently owning or sharing caches 20 invalidating their contents according to protocols well known in the art. Coherence of the caches may be implemented with any of a variety of different cache control protocols including generally "snooping" protocols and those employing directories, as known in the art, and the structure of the bus 14 may be varied accordingly.

The processor units 12 also include the lock elision circuit 24 of the present invention whose operation will be described below.

In a multithreaded program, each processor unit 12 may execute a different thread in parallel. The following description of the present invention will be with respect to such a multiprocessor system. Nevertheless, it will be understood that such multithreaded programs can also be executed on a single processor providing multi-threading capability and the present invention is equally applicable to such systems.

Figure 2:
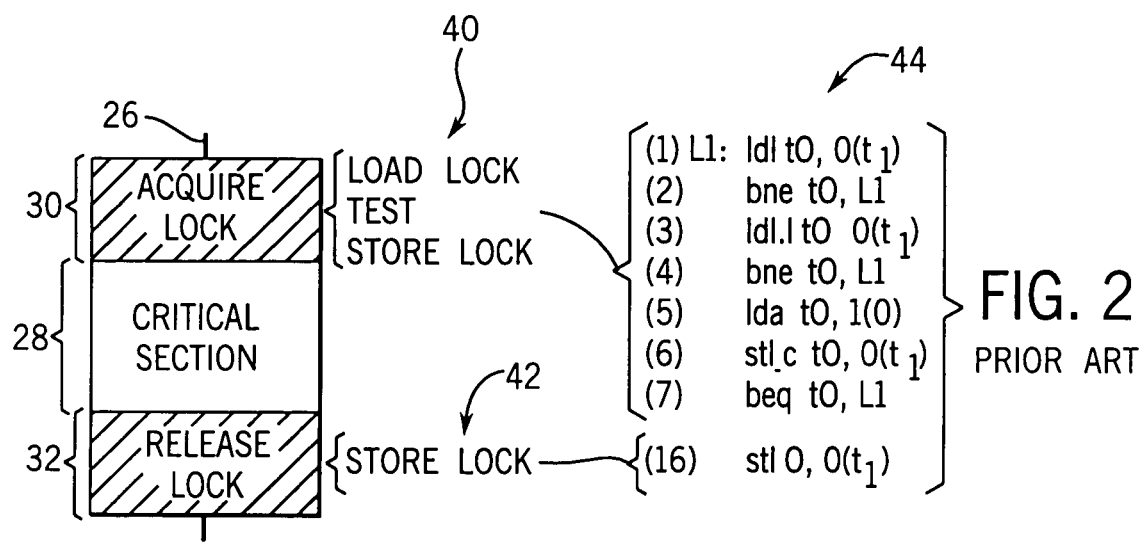
FIG. 2 is schematic representation of a critical section of a thread executable on a processor of FIG. 1, the critical section having a preceding acquire lock section and a succeeding release lock section and showing example machine instructions to implement the same.

Referring now to FIG. 2, a program thread 26 of a multithreaded program may include a critical section 28 where access to shared data structure 25 occurs and conflicts by other threads 26 are possible. Accordingly, the critical section 28 may be preceded by an acquire lock section 30 in which a LOCK variable (not shown but typically part of the shared data structure 25) is acquired. By convention other threads 26 may not access (read or write) data of shared data structure 25 (other than the LOCK variable) while the LOCK variable is held by another thread 26. A corresponding release lock section 32 follows the critical section 28 to allow release of the LOCK variable and access to the shared data structure 25 again by other threads 26.

Figure 3:
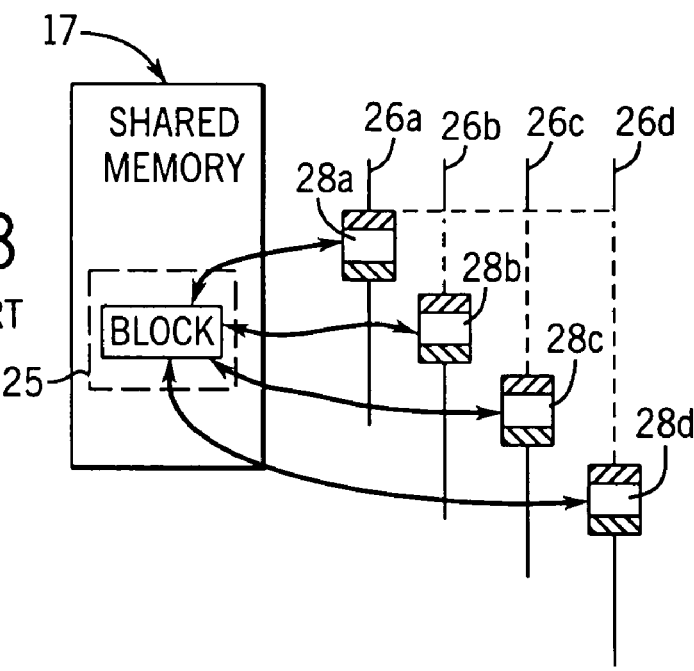
FIG. 3 is a diagrammatic representation of the serialization of multiple threads caused by contention for a lock for a common critical section associated with a block of shared memory.

Referring now to FIG. 3, in the prior art, during a multi-threaded execution of, for example, four threads 26a through 26d, the critical sections 28a through 28d of the four threads 26a through 26d may all access shared data structure 25 associated with a given LOCK variable. As depicted, if thread 26a is first to acquire the LOCK variable in preparation for the execution of its critical section 28a, all other threads 26b through 26d break out of their parallel execution and are serialized while waiting for the LOCK variable to be released from the thread 26 ahead of them. Thus, for example, thread 26b arriving at the acquire locks section 30 shortly after the acquisition of the LOCK by thread 26a, must wait until the release lock section 32 of critical section 28a before initiating execution of critical section 28b. During this waiting time, the thread 26b "spins" as indicated by the dotted line during which execution stalls. As may be seen, the last thread 26d may be required to spin for up to three times the length of execution of the critical section 28 before being able to acquire the LOCK variable. In more complex programs with multiple critical sections 28, or threads repeating execution of critical sections 28, the wait can be arbitrarily longer.

Referring again to FIG. 2, entry into the critical section 28 may be inferred by observing a pattern of instructions that are typically used for acquiring and releasing a LOCK variable in the acquire lock section 30 and the release lock section 32. For example, the acquire lock section 30 may follow an atomic read/modify/write instructions for loading the lock variable, testing the lock variable and storing the lock variable indicated in FIG. 2 by pseudo code 40.

The term "atomic" as used herein refers to an instruction that cannot be interrupted by another thread before completion, or cannot be interrupted before completion without detection. Typically, atomic read/modify/write instructions are readily distinguished from standard STORE and LOAD instructions, and as used herein may include the well known TEST&SET instructions, or as shown, the LOAD LOCK/STORE CONDITIONAL instructions or other equivalent atomic instruction.

These atomic read/modify/write instructions provide some indication of the acquisition of a lock. This indication can be reinforced by a RELEASE sequence having a store instruction directed to same address as the atomic read/modify/write instructions of the ACQUISITION sequence, both indicated by pseudo code 42.

Thus patterns of instructions with common addresses can be used to infer the acquire lock section 30 and release lock section 32 and thus the location of a critical section 28. It is important to note, that this inferential detection of the start and end of a critical section 28 is practical because perfect identification of critical sections 28 is not essential for operation of the invention. If a non-critical section is erroneously identified as a critical section, so long as there is no conflict during its speculative execution, commitment of the speculative execution may still occur without harm. On the other hand, if a critical section is not identified as such, it will simply execute normally.

In situations where an inferred critical section 28 proves at some point during its execution not to have been a critical section, for example, as suggested by a write to a supposed LOCK variable that does not restore the LOCK variable to its pre-critical section "release" value, the preceding speculative execution may simply be committed and the write performed, so long as there has been no conflict. In this respect, lock acquisitions that do not use a single lock release value, for example, those that may release a LOCK variable with any nonzero value, including processor identification values, may still be accommodated by the present invention.

In an alternative embodiment, the invention contemplates the start (and/or end) of the critical section may be identified by one or more special delimiter instructions only used for critical sections. In this case the inference of the beginning of the critical section rises to the level of certainty, but changes in programming practices are required for such a system, unlike that of the preferred embodiment described above.

Referring still to FIG. 2, actual machine code 44 of the acquire lock section 30 may provide further clues to identifying the beginning of the critical section 28. Instructions i(1)–i(7) show an atomic read/modify/write sequence pattern used in the acquisition of a LOCK variable, and in particular, an instruction sequence that uses a specialized LOAD LOCK (1d1_1) instruction i(3) and the STORE CONDITIONAL (stl_c) instruction i(6) which provide quasi atomic execution and thus are frequently associated with the acquisition of a LOCK variable.

In this sequence, generally instructions i(1) and i(2) load the LOCK variable and test it to see if it is available and if not branch to instruction i(1). Instructions i(3) and i(4) execute only if the LOCK variable is not held as tested by instructions i(1) and i(2). These instructions i(3) and i(4) load the LOCK variable conditionally, meaning that other attempted loads of this variable will be detected at the subsequent store conditional instructions i(6).

If the LOCK variable is not held, instructions i(5), i(6) and i(7) are executed causing a conditional store of a "held" value into the LOCK variable. Instruction i(7) tests to see if the STORE CONDITIONAL instruction was successful, and if not causes a repeat of the operations starting at instruction i(1) as true atomicity of instructions i(1)–i(7) was not obtained.

After the critical section 28, instruction i(16) executes the release LOCK variable via a store of the "release" value to the same address.

Referring also to FIG. 1, the lock elision circuit 24 may provide a filter detecting this or a similar pattern to determine the beginning of a critical section 28. In the preferred embodiment, the pattern is a LOAD LOCK instruction followed within a predetermined number of instructions by a STORE CONDITIONAL instruction referencing the same address.

The lock elision circuit 24 identifies the release lock section 32 and hence the end of the critical section 28 by the next STORE instruction to the same address.

The lock elision circuit 24 may include a table (not shown) linking by program counter, a prediction value that a particular instruction is the beginning or end of a critical section 28, and this prediction value may be modified by historical success in the prediction (indicated by a lack of squashing of the speculative execution of the critical section 28) as will be described below. This prediction as to whether a critical section has been found, may be supplemented by a prediction as to whether speculative execution of the critical section will be successful, as will be described below.

Methods of inferring the beginning of a critical section are also discussed in co-pending patent application Ser. No. 09/693,030 filed Oct. 20, 2000 entitled "Method of Using Delays to Speed Processing of Inferred Critical Program Portions" assigned to the same assignee as the present application and hereby incorporated by reference.

Figure 4:
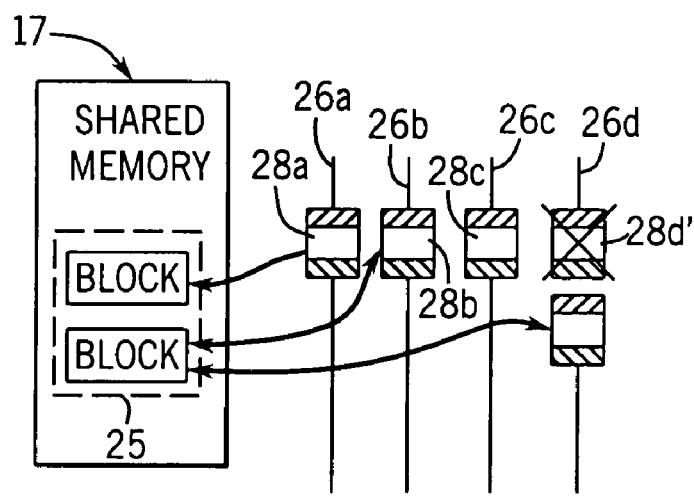
FIG. 4 is a figure similar to that of FIG. 3 showing parallelization of the same critical sections under the present invention.

Referring now to FIG. 4, generally, the present invention uses this ability to infer the beginning and end of a critical section 28 of a thread 26, to change execution modes to execute the critical section 28 speculative until its end. If at the end of the speculative execution, no actual conflict with another thread 26 has occurred, the speculative execution is committed. In this way, the present invention allows the critical sections 28 of multiple ones of the four program threads 26a through 26d to run concurrently provided there is no actual conflict in the dynamic execution, but even though they access the same shared data structure 25 which are subject to the same lock. For example, during execution of its critical section 28, thread 26a may access a first block within shared data structure 25 while thread 26b accesses a second block within the same shared data structure 25. There is no actual conflict in such accesses although this fact may be undetectable statically.

As a second example, thread 26c executing the critical section 28 may have a STORE that may be conditionally executed to access the same block as accessed by thread 26a, yet dynamically this conditional store may not be performed. In this case, again, there is no conflict, however, a conflict would be assumed from static inspection of the threads.

Alternatively, execution of thread 26d, which in this example writes to the same block as thread 26b is delayed by means of its initial execution speculatively (indicated by 26d') being squashed, however, this delay is much reduced over that obtained in the example of FIG. 3.

Figure 5:
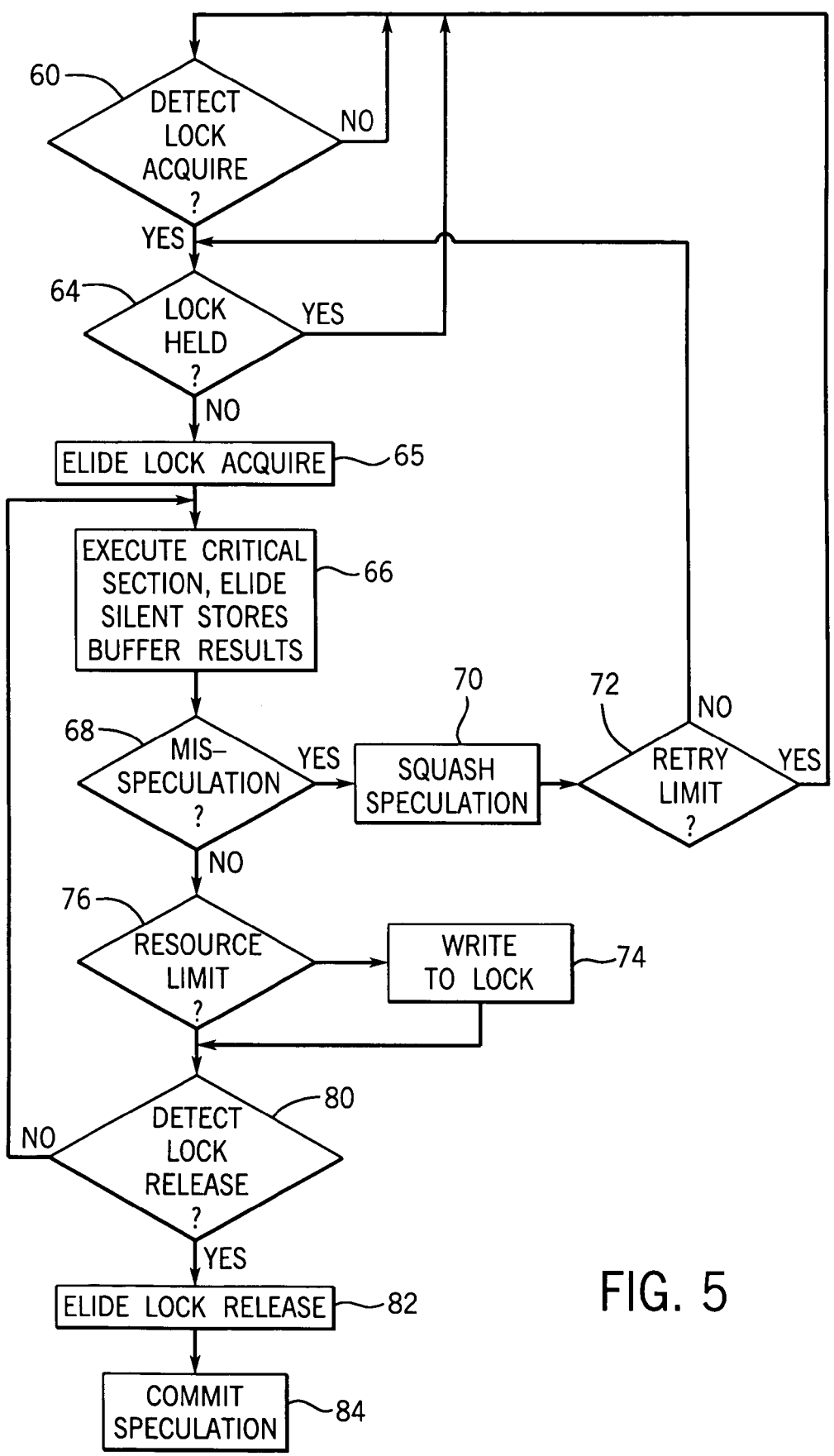
FIG. 5 is a flow chart showing the functions executed by the lock elision circuit of FIG. 1 in implementing the present invention.

Referring now to FIG. 5, the initiation and management of the speculative execution is controlled by the lock elision circuit 24 (shown in FIG. 1). As each instruction is received for execution by the processor 16, the lock elision circuit detects, as indicated by decision block 60, whether an acquire lock section 30 is likely being implemented. This can be done by applying a filter to the instruction buffer to look for the patterns described above. This process will typically be done in hardware and in parallel with standard execution of the instructions When process block 60 detects a lock acquire section, standard execution is modified as will be described below.

If the instructions suggest that no LOCK variable is being acquired, the lock elision circuit 24 loops back while allowing standard execution of the instructions.

If, on the other hand, the instructions suggest that a lock acquisition is being undertaken, the lock elision circuit 24 proceeds to decision block 64 and the lock variable is read to see if the LOCK variable is in the held state.

If the LOCK variable is held, the lock elision circuit 24 again loops back, allowing standard execution which will continue with the execution of instructions i(2) through i(16) as written (as shown in FIG. 2).

In an alternative embodiment, at process block 64, the prediction table forming part of the lock elision circuit 24 may be consulted to see if previous attempts at speculative execution of the critical section 28 have been successful. The prediction table in this case may store the results of the last N attempts at speculation, for example, indexed by program counter value for fast reference, and the lock elision circuit can defer to standard execution if a certain percentage of the last N speculations were not successful.

If the LOCK variable is not held, as indicated by decision block 64, the lock elision circuit 24 proceeds to process block 65 and elides the acquire lock section 30 being instructions i(2)–i(7). The STORE of instruction i(6) may be suppressed because if speculative execution of the remainder of the critical section is successful, it will be undone by the LOAD instruction i(16).

The lock elision circuit 24 then proceeds to process block 66 to begin execution of the critical section 28 starting after instruction i(7) is executed. At this time, the shared data structure 25 necessary for the critical section 28 will be loaded into cache L2 including typically the LOCK variable as was accessed by instruction i(1) and other data needed by the critical section 28. On the other hand, stores by the critical section 28 may be done to the L1 cache 18, which serves as a buffer for the speculative execution of the critical section 28 now being performed, and prevents the effects of the instructions of the critical section from being observed by other processor units 12.

At any time during the execution of the critical section 28, a mis-speculation may occur as detected by process block 68. Such a mis-speculation occurs, as described in part above, if data read by the current thread 26 in the critical section 28 is written to by another thread 26, or if data written to by the current thread 26 in the critical section 28 is read or written to by another thread 26, either of which as would also cause invalidation of cache L2. Thus, standard cache protocol messages may be used to detect such a conflict.

Speculation per process block 66 continues until one of three conditions detected by the following three decision blocks 68, 76, and 80.

The first condition may be caused by the occurrence of a conflict such as produces mis-speculation. This terminates the current speculative execution of the critical section 28 causing the lock elision circuit 24 to squash the speculative execution (as indicated by process block 70) by flushing the L1 cache 18 and restoring the program counter of the processor 16 to the beginning of the critical section 28 detected at decision block 60.

Following this squashing, if at decision block 72, a retry limit has not been exceeded, the lock elision circuit 24 proceeds back to decision block 60 to begin speculative execution of the critical section 28 again after detecting the acquire lock section 30.

If the retry limit has been exceeded as checked at decision block 72, indicating that a certain number of retries has been performed without successful speculative execution of the critical section 28, the lock elision circuit 24 branches to decision block 60 and a write to the LOCK variable is completed per instructions i(1) through i(7) in standard execution.

If at decision block 68, no mis-speculation has occurred, the lock elision circuit 24 checks at decision block 76 whether speculation resources have been exhausted. These resource boundaries may vary depending on the particular architecture of the computer 10 and its speculation mechanism, but generally include exhaustion of the L1 cache 18 when used for speculation, or if a register checkpoint mechanism is used, as is well known for speculation, the cache 20 used to store the register checkpoints for squashing has been exhausted, or in those architectures in which a reorder buffer is used for recovery of branch mis-speculation, that buffer is exhausted.

In these situations where a resource boundary has been reached, but there has been no conflict, squashing is not required at process block 74, an acquisition of the lock may be performed and the lock elision circuit 24 may proceed with speculative execution from the point where it stopped, the resources being made free by committing the speculation up to that point. If the lock cannot be acquired, the speculative execution is squashed as has been described.

A variation of the occurrence of a resource boundary, that is treated in the same way, is the occurrence of a non-cacheable operation, such as a write to an input/output (I/O) location. I/O differs from cacheable memory in that, for example, multiple writes of the same value to I/O may not necessarily be ignored. Decision block 76 may also detect such non-cacheable operations.

At process block 80, the lock elision circuit 24 detects whether a release lock section 32 has occurred being a STORE instruction using the same address detected in the acquire lock section 30 detected at decision block 60. If a lock release has occurred, the lock elision circuit 24 proceeds to process block 82 and the STORE instruction 16 is elided as the LOCK variable is already released because of the elision of instruction i(5) at process block 65.

It will be recognized that if the critical section inferred by decision block 60 is not truly a critical section 28, the misidentified STORE instructions may still be elided without harm as it can be guaranteed that no intervening LOAD instructions by any thread have occurred when speculation is successful.

At process block 84, succeeding process block 82, the speculative execution is then committed by updating cache L2 with the L1 cache L1.

Referring again to FIG. 5, in a further embodiment of the present invention, the execution of STORE instructions within the critical section 28 may be examined to see if they are "silent stores", that is, stores that do not change the value of the memory location to which the store is directed. In so far as the speculation assumes for its success that no other threads 26 access the shared data structure 25, these STORE instructions may be suppressed. Detection of silent stores requires only that each STORE instruction within the critical section 28 be reviewed to see if it would change the value at the target address. If not, the STORE instruction is elided.

This detection of silent stores allows parallel execution of critical sections even when there are technically, true conflicts, that is, STORES by different threads to the same address. By suppressing the silent STORE instructions, the threads do not create a write-event to the shared data structure 25 such as would cause a mis-speculation in the given thread 26 operating in the critical section 28.

It will be recognized that the above described invention may be used for nested critical sections 28 simply by buffering the states of the variables required by the flow chart of FIG. 5. No memory ordering problems exist because the speculative execution of the critical section has the appearance of atomicity when the data accessed by the critical section has not been accessed by any other thread.

As will be understood from the above description, the presenting invention is applicable to a wide range of different computer architectures and should not be construed to be limited to the particular architecture described herein. The speculative execution of the critical section may employ other speculation mechanism including those employing, "register checkpoints" or "reorder buffers", all well known in the art. It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of coordinating access to common memory by multiple program threads comprising the steps of:
    in each given program thread,
    (a) detecting the beginning of a critical section of the given program thread in which interruption to access of the common memory could occur resulting from execution of other program threads;
    (b) speculatively executing the critical section; and
    (c) committing the speculative execution of the critical section if there has been no interruption to access of the common memory and squashing the speculative execution of the critical section if there has been an interruption wherein the speculative execution is committed upon the occurrence of a non cacheable operation limiting further speculation.

2. The method of claim 1 wherein the interruption is:
    (a) another thread writing data read by the given program thread in the critical section, or
    (b) another thread reading or writing data written by the given program thread.

3. The method of claim 2 wherein the interruption is detected by an invalidation of a cache block holding data of the critical section.

4. The method of claim 1 wherein absent the occurrence of a non cacheable operation limiting further speculation, the speculative execution is committed at the end of the critical section.

5. The method of claim 4 wherein the end of the critical section is detected by a pattern of instructions typically associated with a lock release.

6. The method of claim 5 wherein the pattern of instructions is a store instruction to a deduced lock variable address.

7. The method of claim 1 wherein absent the occurrence of a non cacheable operation limiting further speculation, the speculative execution is committed at a resource boundary limiting further speculation.

8. The method of claim 7 including the step of:
    (d) if at step (c) there was no interruption from the execution of another thread acquiring a lock variable allowing the given thread to have exclusive access to the critical section and continuing execution from the commitment point to the conclusion of the critical section.

9. The method of claim 1 including the step of:
(d) if at step (c) there was no interruption from the execution of another thread acquiring a lock variable allowing the given thread to have exclusive access to the critical section and continuing execution from the commitment point to the conclusion of the critical section.

10. The method of claim 1 wherein step (a) includes reading of a lock variable and wherein step (b) is performed only when the lock variable is not held by another program thread.

11. The method of claim 1 wherein step (a) includes reading a prediction table holding historical data indicating past successes in speculatively executing the critical section and wherein step (b) is performed only when the prediction table indicates a likelihood of successful speculative execution of the critical section of above a predetermined threshold.

12. The method of claim 1 wherein the critical section is preceded by a lock acquisition section and including the step of eliding the lock acquisition before step (b).

13. The method of claim 1 wherein the critical section ends with a lock release section and including the step of eliding the lock release section after step (c) when at step (c) upon reaching the end of the critical section, no interruption from the execution of another thread occurred.

14. The method of claim 1 including the further step of:
(d) after squashing the speculative execution of the critical section if there has been a interruption, re-executing the critical section speculatively.

15. The method of claim 14 wherein the speculative re-execution of the critical section is repeated up to a predetermined number of times until there is not a interruption.

16. The method of claim 15 wherein (d) if after the predetermined number of tries there remains a interruption from the execution of another thread, acquiring a lock variable allowing the given thread to have exclusive access to the critical section and continuing execution of the critical section from its beginning.

17. The method of claim 1 wherein the speculation executes the critical section using a cache memory to record the speculative execution without visibility to other processing units.

18. A method of coordinating access to common memory by multiple program threads comprising the steps of:
in each given program thread,
(a) detecting the beginning of a critical section of the given program thread in which interruption to access of the common memory could occur resulting from execution of other program threads;
(b) speculatively executing the critical section; and
(c) committing the speculative execution of the critical section if there has been no interruption to access of the common memory and squashing the speculative execution of the critical section if there has been an interruption wherein the speculation executes the critical section eliding write instructions that do not change a value of memory location being written to.

19. The method of claim 18 wherein step (a) deduces the beginning of a critical section by detecting patterns of instructions typically associated with a lock acquisitions.

20. The method of claim 19 wherein the pattern includes an atomic read/modify/write sequence.

21. The method of claim 18 wherein the interfering access to the common memory is:

(a) another thread writing data read by the given program thread in the critical section, or
(b) another thread reading or writing data written by the given program thread.

22. The method of claim 21 wherein the computer architecture includes a cache and the interruption is detected by an invalidation of a cache block holding data of the critical section.

23. The method of claim 18 wherein the speculative execution is committed at the end of the critical section.

24. The method of claim 23 wherein the end of the critical section is detected by a pattern of instructions typically associated with a lock release.

25. The method of claim 24 wherein the pattern of instructions is a store instruction to a deduced lock variable address.

26. The method of claim 18 wherein the speculative execution is committed at a resource boundary limiting further speculation.

27. The method of claim 26 wherein when there is no interfering access to the common memory from the execution of another thread acquiring a lock variable, the lock elision circuit allows the given thread to have exclusive access to the critical section and continues execution from the commitment point to the conclusion of the critical section.

28. The method of claim 18 wherein the lock elision circuit reads a lock variable and speculatively executes the critical section only when the lock variable is not held by another program thread.

29. The method of claim 18 wherein the speculative execution is committed upon the occurrence of a non cacheable operation limiting further speculation.

30. The method of claim 29 including the step of:
(d) if at step (c) there was no interfering access to the common memory from the execution of another thread, acquiring a lock variable allowing the given thread to have exclusive access to the critical section and continuing execution from the commitment point to the conclusion of the critical section.

31. The method of claim 18 including a prediction table holding historical data indicating past successes in speculatively executing the critical section and wherein the lock elision circuit speculatively executes the critical section only when the prediction table indicates a likelihood of successful speculative execution of the critical section of above a predetermined threshold.

32. The method of claim 18 wherein the lock elision circuit determines the beginning of a critical section by detecting patterns of instructions typically associated with a lock acquisitions.

33. The method of claim 32 wherein the pattern includes an atomic read/modify/write sequence.

34. The method of claim 18 wherein the critical section is preceded by a lock acquisition section and wherein the lock elision circuit elides the lock acquisition before speculation.

35. The method of claim 18 wherein the critical section ends with a lock release section and wherein the lock elision circuit elides the lock release section after speculation when upon reaching the end of the critical section, no interfering access to the common memory from the execution of another thread occurred.

36. The method of claim 18 wherein after squashing the speculative execution of the critical section, if there has been an interfering access to the common memory, the lock elision circuit re-executes the critical section speculatively.

37. The method of claim 36 wherein the lock elision circuit repeats the speculative re-execution of the critical section up to a predetermined number of times until there is not an interfering access to the common memory.

38. The method of claim 37 wherein if after the predetermined number of tries there remains an interfering access to the common memory from the execution of another thread, the lock elision circuit allows acquisition of a lock variable allowing the given thread to have exclusive access to the critical section and continuing execution of the critical section from its beginning.

39. The method of claim 18 wherein the computer architecture includes a cache memory and the lock elision circuit uses the cache memory to record the speculative execution without visibility to other processing units.

40. The method of claim 18 wherein the lock elision circuit elides write instructions within the critical section that do not change a value of memory location being written to.

41. The method of claim 18 wherein the value in memory subject to the elided write instruction is a lock variable for controlling access to the critical section by competing program threads.

42. The method of claim 18 wherein step (a) deduces the beginning of a critical section by detecting special delimiter instructions.

43. The method of claim 1 wherein step (a) deduces the beginning of a critical section by detecting special delimiter instructions.

* * * * *

UNITED STATES PATENT AND TRADEMARK OFFICE
CERTIFICATE OF CORRECTION

PATENT NO. : 7,120,762 B2
APPLICATION NO. : 10/037041
DATED : October 10, 2006
INVENTOR(S) : Raj Rajwar et al.

It is certified that error appears in the above-identified patent and that said Letters Patent is hereby corrected as shown below:

Col. 1, line 8   Replace "--" with --This invention was made with United States government support awarded by the following agency: NSF 9810114. The United States government has certain rights in this invention.--

Signed and Sealed this

Twenty-fourth Day of November, 2009

David J. Kappos
*Director of the United States Patent and Trademark Office*